(12) United States Patent  (10) Patent No.: US 7,898,182 B2
Futamura  (45) Date of Patent: Mar. 1, 2011

(54) HEADLIGHT CONTROL DEVICE AND METHOD FOR VEHICLES

(75) Inventor: Shinichi Futamura, Kuwana (JP)

(73) Assignee: Denso Corporation, Kariya (JP)

( * ) Notice: Subject to any disclaimer, the term of this patent is extended or adjusted under 35 U.S.C. 154(b) by 958 days.

(21) Appl. No.: 11/804,033

(22) Filed: May 16, 2007

(65) Prior Publication Data

US 2007/0268159 A1  Nov. 22, 2007

(30) Foreign Application Priority Data

May 18, 2006 (JP) ................. 2006-138961

(51) Int. Cl.
B60Q 1/26 (2006.01)
B60Q 1/02 (2006.01)
(52) U.S. Cl. ............................. 315/80; 315/82
(58) Field of Classification Search ............... 315/76–83
See application file for complete search history.

(56) References Cited

U.S. PATENT DOCUMENTS

| 6,406,172 | B1 * | 6/2002 | Harbers et al. | 362/544 |
| 7,004,606 | B2 * | 2/2006 | Schofield | 362/460 |
| 7,449,997 | B2 * | 11/2008 | Furusawa et al. | 340/468 |
| 7,541,743 | B2 * | 6/2009 | Salmeen et al. | 315/77 |
| 7,565,006 | B2 * | 7/2009 | Stam et al. | 382/155 |
| 7,653,215 | B2 * | 1/2010 | Stam | 382/104 |
| 2002/0045978 | A1 | 4/2002 | Nishimura et al. | |
| 2002/0057572 | A1 | 5/2002 | Kondo et al. | |
| 2004/0189447 | A1 | 9/2004 | Okubo et al. | |
| 2004/0218401 | A1 | 11/2004 | Okubo et al. | |

FOREIGN PATENT DOCUMENTS

| JP | 01-111546 | 4/1989 |
| JP | 05-278518 | 10/1993 |
| JP | 09-136569 | 5/1997 |
| JP | 2002-144952 | 5/2002 |
| JP | 2002-225619 | 8/2002 |
| JP | 2004-098819 | 4/2004 |

OTHER PUBLICATIONS

Office action dated Nov. 17, 2009 in corresponding Japanese Application No. 2006-138961.

* cited by examiner

*Primary Examiner* — Douglas W Owens
*Assistant Examiner* — Minh D A
(74) *Attorney, Agent, or Firm* — Harness, Dickey & Pierce, PLC

(57) ABSTRACT

If a beam state of headlight is manually switched over in a manual control mode, threshold values of vehicle speed, steering angle or the like, are learned for determining the switching over to the low-beam state or to the high-beam state based on the results detected by a speed sensor, illumination sensor, steering angle sensor and weather sensor, and are stored in a nonvolatile memory. In an automatic control mode, a CPU determines the switching over to the low-beam state or to the high-beam state based on the traveling condition detected by the illumination sensor by using the threshold values for determining the switching over learned in the manual control mode. The CPU automatically switches over the state of the beam of the headlight based upon the determination result.

15 Claims, 4 Drawing Sheets

HEADLIGHT CONTROL DEVICE AND METHOD FOR VEHICLES

CROSS REFERENCE TO RELATED APPLICATION

This application is based on and incorporates herein by reference Japanese Patent Application No. 2006-138961 filed on May 18, 2006.

FIELD OF THE INVENTION

The present invention relates to a headlight control device and method for vehicles and, particularly, to a headlight control device and method for vehicles which detects the condition in which a vehicle is traveling and automatically switches over the illumination state of the headlight.

BACKGROUND OF THE INVENTION

In a conventional headlight control device (for example, JP 2004-98819A), the illumination in front of a vehicle is detected by an illumination sensor or the like. The headlight is automatically switched over to the high-beam when the illumination in front is darker than a predetermined threshold illumination level. It is switched over to the low-beam when the illumination in front is brighter than the threshold illumination level to maintain visibility while preventing dazzling to vehicles in front.

The operation for switching over to the low-beam and to the high-beam is executed relying upon a change in the illumination in front, and the switching operation is often executed too frequently depending upon the conditions in front. This frequent switching often becomes offensive to drivers of other vehicles.

SUMMARY OF THE INVENTION

It is an object of the present invention to provide a headlight control device and method for vehicles capable of automatically switching over the illuminating condition of a headlight.

According to one aspect of the present invention, a headlight control device for vehicles has a manual switch for manually switching over an illumination state of a headlight between a low illumination state and a high illumination state where the amount of illumination to a distance is larger than that in the low illumination state. The headlight control device has a control unit for automatically switching the illumination state of the headlight to either the first illumination state or the second illumination state depending upon a vehicle traveling condition such as a travel speed, front illumination state, steering angle, weather. The control unit learns a threshold value for determining switching over to the low illumination state or to the high illumination state based on the traveling condition when the illumination state of the headlight is manually switched. The control unit automatically determines the switching over between the low illumination state and the high illumination state by using the learned threshold value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

Figure 1:
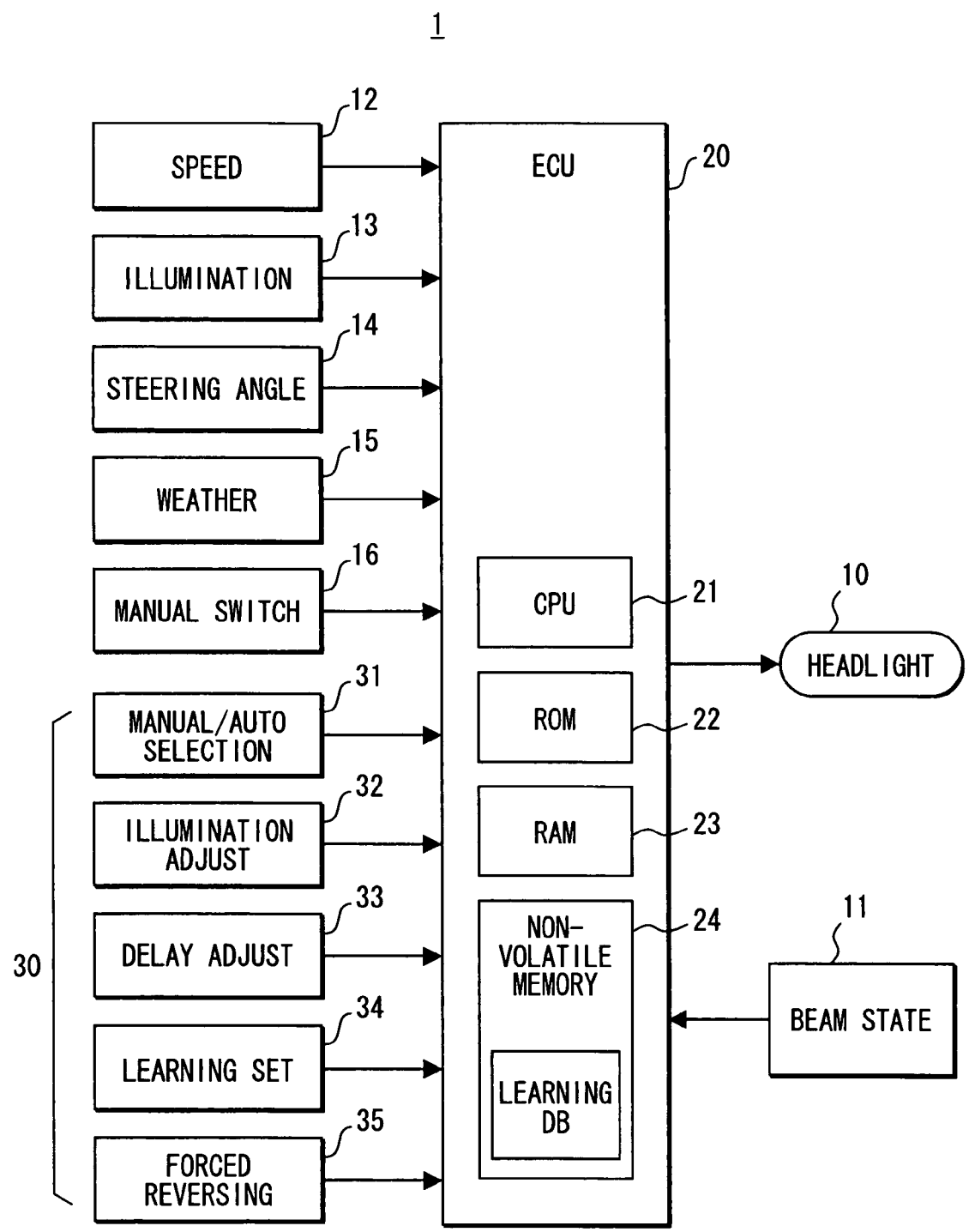
FIG. 1 is a block diagram illustrating a headlight control device for vehicles according to an embodiment of the invention.
Figure 2:
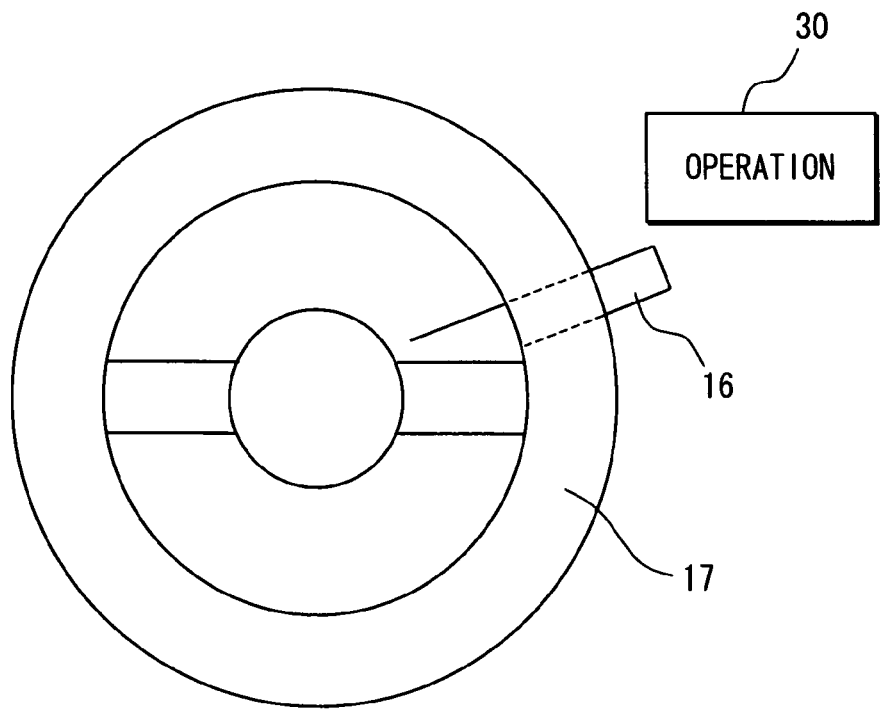
FIG. 2 is a schematic view illustrating a switch for manually switching the state of a beam and of an operation unit at a driver's seat in the embodiment.

Referring to FIG. 1, a headlight control device 1 for vehicles includes a headlight 10, a beam state detector unit 11, a vehicle speed sensor 12, an illumination sensor 13, a steering angle sensor 14, a weather sensor 15, a manual switch 16 for manually switching the state of the beam, a headlight switch control ECU 20, and an operation unit 30 (FIG. 2). Here, the vehicle speed sensor 12 operates as traveling condition detector means and vehicle speed detector means, the illumination sensor 13 operates as the traveling condition detector means and front illumination detector means, the steering angle sensor 14 operates as the traveling condition detector means and turning condition detector means, the weather sensor 15 operates as the traveling condition detector means and weather condition detector means, and the switch 16 for manually switching the state of the beam operates as manual switching means.

The headlight 10 comprises known headlamps disposed at the right and left on the front of the vehicle and having a reflector, a lens and two filaments for a low-beam and a high-beam, although not shown. The filament for the low-beam is positioned slightly higher than the focal point of the reflector, and the filament for the high-beam is positioned at the focal point of the reflector. The filaments are so constituted as can be switched over to the low-beam state where the filament for low-beam only is turned on and to the high-beam state where both the filament for low-beam and the filament for high-beam are turned on to produce a large amount of illumination reaching farther than that of the low-beam state. The low-beam state represents a first illumination state and the high-beam state represents a second illumination state.

The beam state detector unit 11 is a sensor which produces an electric signal representing the state of the beam of the headlight 10. Specifically, the beam state detector unit 11 produces a low-beam turn-on signal when the headlight 10 is in the state of the low-beam and produces a high-beam turn-on signal when the headlight 10 is in the state of the high-beam.

The vehicle speed sensor 12 may be a known vehicle speed detector that detects the vehicle speed and produces the detected result as a vehicle speed signal. When the vehicle speed is high, the driver normally views a farther position in front. In this case, the high-beam state of the headlight 10 is suited for maintaining visibility in a distant range.

The illumination sensor 13 is may be a known illumination detector device which detects the illumination in front of the vehicle and produces the detected result as an illumination signal. When the front illumination is bright, for example, when a source of light such as a headlight or a taillight of another vehicle is present in front of the vehicle, the low-beam state of the headlight 10 is suited for preventing dazzling to other vehicles.

The steering angle sensor 14 may be a known steering angle detector device which detects the steering angle of the steering wheel 41 and produces the detected result as a steering angle signal. When the steering angle is large, for example, when traveling on a road such as a curved road having a small radius of curvature, the front direction cannot be seen through. In this case, the low-beam state of the headlight 10 is suited since there is no need of switching over to the high-beam state and, besides, from the standpoint of maintaining visibility just in front of the vehicle where more light is required.

The weather sensor 15 may be a known weather detector device which detects the rainfall, snowfall and fog, and produces the detected result as a weather signal. The weather data represented by the weather signal assumes a value that increases with an increase in the amount of rainfall, snowfall or in the density of fog (i.e., as the weather worsens). In the case of a bad weather, the high-beam of the headlight 10 rather makes it difficult to maintain visibility due to irregular reflection. Therefore, the low-beam state is selected.

The manual switch 16 may be a switch which is manually operated by a driver for switching the state of the beam of the headlight 10 either to the low-beam state or to the high-beam state, and is provided near a steering wheel at a driver's seat as shown in FIG. 2.

The headlight switch control ECU (electronic control unit) 20 includes a CPU 21 which is a known central processing unit for executing various kinds of operation processings, a ROM 22 storing a control program and various data, a RAM 23 for temporarily storing various kinds of data, and an electrically rewritable nonvolatile memory 24, and works as a control circuit for controlling the state of the beam (i.e., illumination state) of the headlight 10. The ECU 20 receives signals output from the beam state detector unit 11, vehicle speed sensor 12, steering angle sensor 13, illumination sensor 14 and weather sensor 15. The CPU 21 which executes the program for switching the state of the beam operates as automatic switching means and learning means and the nonvolatile memory 24 operates as learning means.

Figure 3:
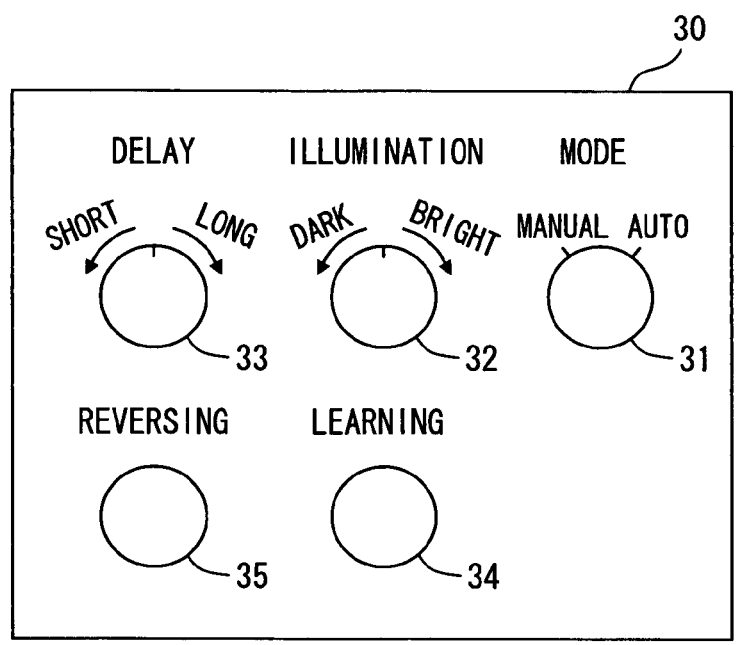
FIG. 3 is a front view illustrating the operation unit in the embodiment.

An operation unit 30 is disposed near the driver's seat in a vehicle compartment, and is used for effecting the setting operation related to switching the state of the beam of the headlight 10. As shown in FIG. 1 and FIG. 3, the operation unit 30 includes an operation selection switch 31, a threshold illumination level-adjusting switch 32, a delay-adjusting switch 33, a learning setting button 34 and a forced reversing button 35.

The manual/automatic selection switch 31 is for selecting an automatic control mode (corresponds to the automatic control mode) for automatically switching the headlight 10 to the low-beam state and to the high-beam state, and a manual control mode (corresponds to the manual control mode) which does not automatically switch the state of the beam of the headlight 10 but in which the state of the beam can be switched by hand only by using the switch 16 for manually switching the state of the beam. The operation selection switch 31 is turned to the "auto" position to select the automatic control mode and is turned to the "manual" position to select the manual control mode.

The threshold illumination level-adjusting switch 32 is for adjusting the threshold illumination level for checking whether the state of the beam of the headlight 10 be selected to be the low-beam state or the high-beam state in the automatic control mode. When turned clockwise, an adjustment level of threshold illumination level increases. When turned counterclockwise, on the other hand, the adjustment level of threshold illumination level decreases.

The delay-adjusting switch 33 is for adjusting the length of delay (delay time) that is provided after the condition is established for switching the low-beam state over to the high-beam side but prior to executing the switching operation. When turned clockwise, the delay time is lengthened. When turned counterclockwise, on the other hand, the delay time is shortened.

The learning setting button 34 is for setting if learning a reference for switching over the state of the beam be enabled in the manual control mode. An actuation of the learning setting button 34 enables the learning of a threshold value for checking if the state of the beam be switched.

The forced reversing button 35 is for inputting to the ECU 20 an instruction for forced reversion in case the operation is effected contrary to the driver's liking in the automatic control mode, i.e., for forced reversion to the low-beam state in case the high-beam state is selected though the driver prefers the low-beam state or for forced reversion to the high-beam state in case the low-beam state is selected though the driver prefers the high-beam state.

Next, the processing for switching the state of the beam executed by the CPU 21 in the ECU 20 will be described with reference to a flowchart of FIGS. 4 and 5. The processing program for switching over the state of the beam of FIGS. 4 and 5 is stored in the ROM 22, and the CPU 21 executes the program by reading it from the ROM 22 at regular intervals.

Figure 4:
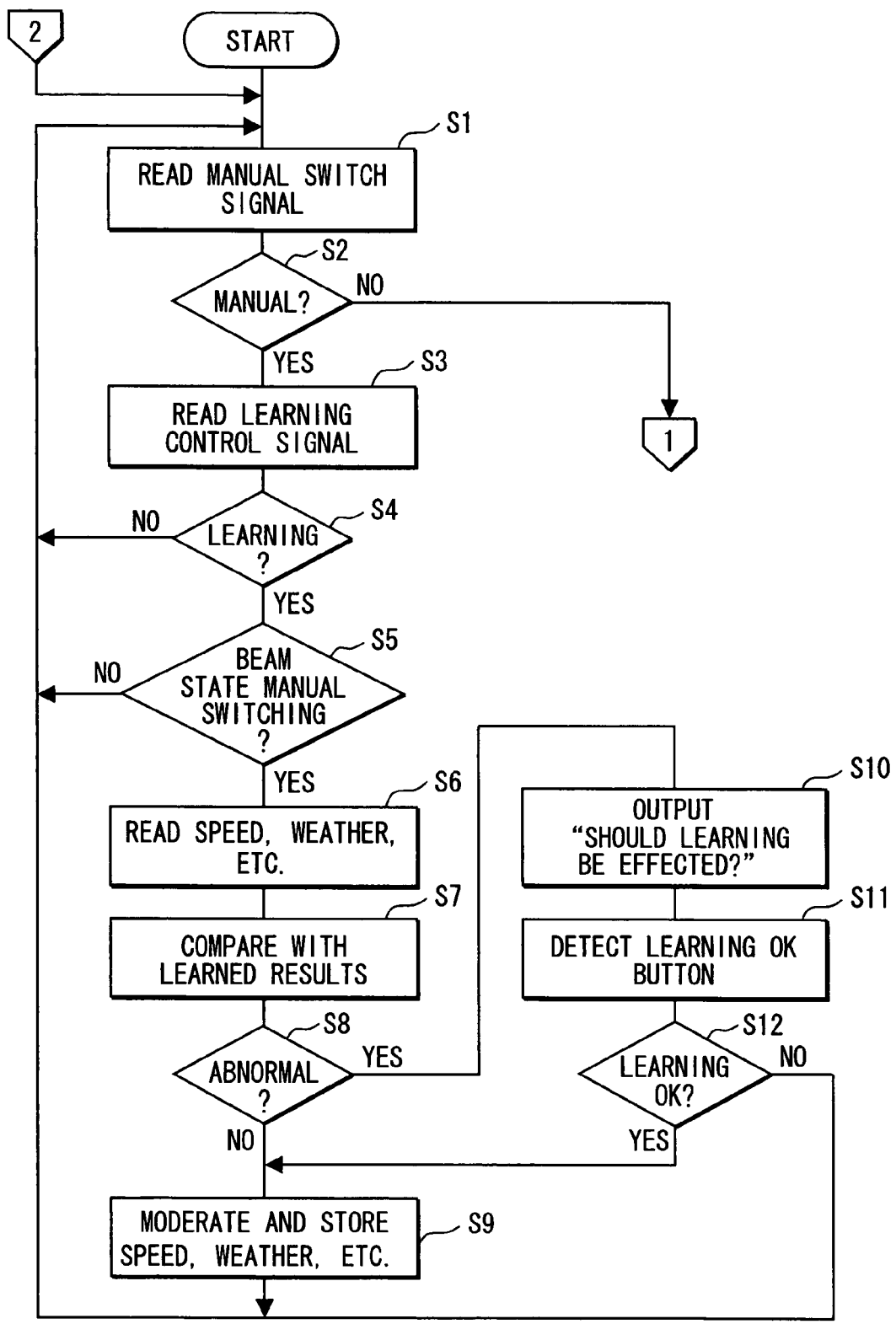
FIG. 4 is a flowchart illustrating a part of processing for switching over the state of the beam in the embodiment.
Figure 5:
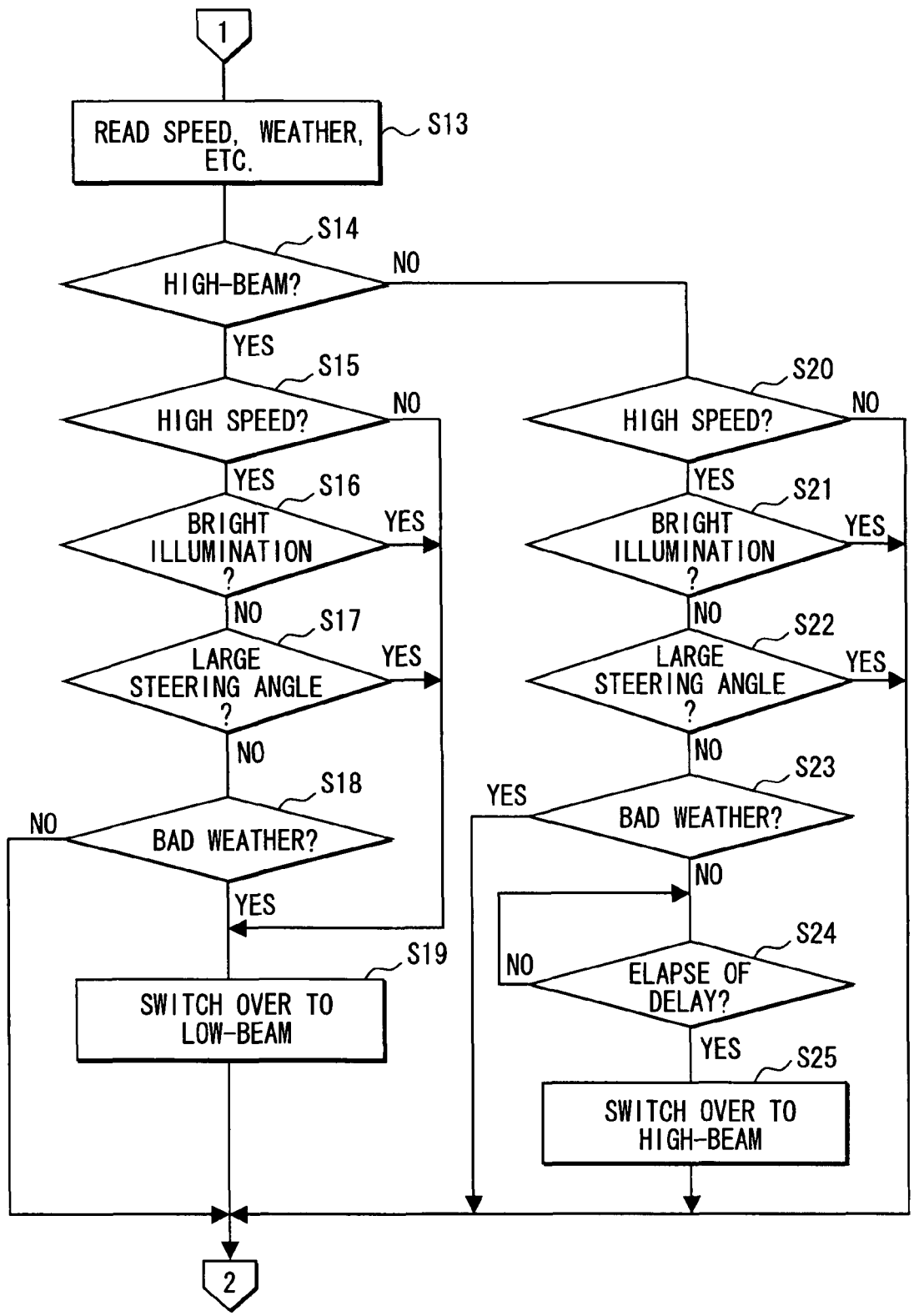
FIG. 5 is a flowchart illustrating the other part of processing of FIG. 4.

In the processing of FIGS. 4 and 5, a manual operation signal is, first, read (step 1) and is checked if it is ON (S2). If the manual operation signal is ON (S2: yes) indicating the manual operation, the learning control signal is read (S3) and is checked if it is ON (S4) indicating learning.

If the learning control signal is ON (S4: yes), it is checked if the state of the beam of the headlight 10 is manually switched from the low-beam state over to the high-beam state or from the high-beam state over to the low-beam state (S5). If the state of the beam is manually switched (S5: yes), the vehicle speed is read from the vehicle speed sensor 12, the degree of illumination is read from the illumination sensor 13, the steering angle is read from the steering angle sensor 13, and the weather data is read from the weather sensor 15 (S6). The detected values that are read are compared with learned results that have been stored in the nonvolatile memory 24 (S7) to check whether the detected values are abnormal relative to the existing learned data (S8).

If the detected data are not abnormal at S8 (S8: no), learn processing is executed to learn the detected values such as the vehicle speed, illumination, steering angle and weather as threshold values for determining the switching over to the low-beam state or to the high-beam state (S9). That is, the detected values are moderated (averaged) and are stored in a learning DB (database) in the nonvolatile memory 24. The moderation is a processing for calculating, for example, cumulative mean of the detected values. After the learn processing at S9, the processing returns to S1.

If the detected values are abnormal at S8 (S8: yes), on the other hand, a message (e.g., "SHOULD LEARNING BE EFFECTED?") is output by voice using a car navigation device to ask if the driver needs the learning (S10). Next, an output of a learning OK button displayed, for example, on a touch panel-type liquid crystal display of the car navigation device is detected (S11). If the output is ON (S12: yes) indicating learning OK, the processing proceeds to the learn processing at S9. If the output of the learning OK button is not ON (S12: no), the processing returns to S1. The learning setting switch 34 may also be used as the learning OK button.

If the manual operation signal S2 is OFF (S2: no) indicating the automatic control mode, the automatic control mode is assumed. The vehicle speed is read from the vehicle speed sensor 12, the degree of illumination is read from the illumination sensor 13, the steering angle is read from the steering angle sensor 13, and the weather data is read from the weather sensor 15 (S13). Next, if the high-beam state is selected is checked based on a signal from the beam state detector unit 11.

If the high-beam state is selected (S14: yes), it is checked if the vehicle speed is higher than a threshold vehicle speed (S15). The threshold vehicle speed is learned at S9 and is stored in the learning DB of the nonvolatile memory 24.

If the vehicle speed is higher than the threshold vehicle speed (S15: yes), it is checked if the illumination is brighter than the threshold illumination level+adjustment level (S16). The threshold illumination level is learned at S9 and is stored in the learning DB of the nonvolatile memory 24. The adjustment level is determined depending upon a position to where the threshold illumination level-adjusting switch 32 is turned, and is zero at the central position, assumes a positive value at positions on the right side of the center, and assumes a negative value at positions on the left side thereof. If the illumination is darker than the threshold illumination level+adjustment level (S16: no), it is checked if the steering angle is larger than a threshold steering angle (S17). The threshold steering angle is learned at S9 and is stored in the learning DB in the nonvolatile memory 24. If the steering angle is smaller than the threshold steering angle (S17: no), it is checked if the weather is worse than a threshold weather value (S18). If the weather is worse than the threshold weather value (S18: yes), the low-beam state is automatically selected (S19), and the processing returns to S1. The threshold weather value is learned at S9 and is stored in the learning DB in the nonvolatile memory 24. The low-beam state is automatically selected (S19) even if the result is no at S15, is yes at S16 or is yes at S17, and the processing returns to S1. If the result is no at S18 (i.e., weather is fine), the high-beam state is maintained without switching the state of the beam, and the processing returns to S1.

If the high-beam state has not been selected at S14, i.e., the low-beam state has been selected (S14: no), it is checked if the vehicle speed is higher than the threshold vehicle speed (S20). If the vehicle speed is higher than the threshold vehicle speed (S20: yes), it is checked if the illumination is brighter than the threshold illumination level+adjustment level (S21). If the illumination is darker than the threshold illumination level+adjustment level (S21: no), it is checked if the steering angle is larger than the threshold steering angle (S22). If the steering angle is smaller than the threshold steering angle (S22: no), it is checked if the weather data is worse than the threshold weather value (S23). If the weather is not worse than the threshold weather value (i.e., weather is fine)(S23: no), it is checked if the time has passed longer than the delay time set by the delay-adjusting switch 33 (S24), and S24 is repeated until the time passes longer than the delay time. If the time has passed longer than the delay time (S24: yes), the high-beam state is automatically selected (S25) and the processing returns to S1. If the result is no at S20, yes at S21, yes at S22 or yes at S23, the low-beam state is maintained without switching the state of the beam, and the processing returns to S1.

According to this embodiment, if the state of the beam of the headlight 10 is manually switched by using the manual switch 16 for manually switching the state of the beam in the manual control mode, the threshold values (threshold vehicle speed, threshold illumination level, threshold steering angle, threshold weather value) are learned for determining the switching over to the low-beam state or to the high-beam state based on the results detected by the vehicle speed sensor 12, illumination sensor 13, steering angle sensor 14 and weather sensor 15, and are stored in the nonvolatile memory 24. In the automatic control mode, the CPU 21 determines the switching over to the low-beam state or to the high-beam state based on the traveling condition detected by the illumination sensor 13 and the like by using the threshold values for determining the switching over learned in the manual control mode. The CPU 21 automatically switches over the state of the beam of the headlight 10 based upon the result thereof. Since the threshold values for determining the switching over to the low-beam state or to the high-beam state have been learned based on the traveling condition at the time of manual switching, the state of the beam of the headlight 10 can be automatically switched over to meet the habit and liking of the driver.

Further, since the threshold values for determining the switching over are learned during the learning conditions, erroneous learning is prevented. That is, the learning conditions include the case where the values representing the traveling condition detected by the illumination sensors 13 and the like sensors at the time of manual switching are not abnormal values, making it possible to prevent that the learning is conducted based on abnormal values. The learning conditions, further, include the case where the manual control mode is being assumed. Therefore, the threshold value for determining the switching over can be correctly learned based on the traveling condition of when the state of the beam of the headlight 10 is manually switched by the driver by using the switch 16 for manually switching the state of the beam in the manual control mode.

Further, since the threshold values for determining the switching over are learned by moderating the values that represent the traveling condition detected by the illumination sensor 13 and the like sensors at the time of manual switching, a sudden variation in the threshold values for determining the switching over can be suppressed.

Further, the threshold illumination level is adjusted by using the threshold illumination level-adjusting switch 32 and, therefore, the state of the beam of the headlight 10 can be automatically switched over to meet the liking of the driver.

The threshold illumination level learned based on the front illumination at the time of manual switching, the threshold vehicle speed learned based on the vehicle speed at the time of manual switching, the threshold steering angle learned based on the steering angle at the time of manual switching, and the threshold weather value learned based on the weather data at the time of manual switching are stored as threshold values for determining the switching over. By using the threshold illumination level, threshold vehicle speed, threshold steering angle and threshold weather value, therefore, it is allowed to determine the switching into the state of the beam that meets the habit and liking of the driver.

Here, the initially set threshold illumination level as the reference level is denoted by TL, threshold vehicle speed is denoted by TV, threshold steering angle is denoted by TS, threshold weather value is denoted by TW (all fixed values) and the learned threshold value is denoted by TLa, learned threshold vehicle speed is denoted by TVa, learned threshold steering angle is denoted by TSa and learned threshold weather value is denoted by TWa (all variable values).

If, for example, a driver switches over from the low beam to the high beam under an illumination brighter than the threshold illumination level TL in the manual control mode, the learned threshold illumination level TLa becomes TLa>TL. In the automatic control mode, in this case, the low beam is automatically switched over to the high beam under a condition where the front is brighter than what was initially set.

Further, if the low beam is switched over to the high beam at a vehicle speed lower than the threshold vehicle speed TV in the manual control mode, the learned threshold vehicle speed TVa becomes TVa<TV. In the automatic control mode, in this case, the low beam is automatically switched over to the high beam at a vehicle speed lower than what has been initially set.

Further, if the high beam is switched over to the low beam at a steering angle smaller than the threshold steering angle TS in the manual control mode, the learned threshold steering angle TSa becomes TSa<TS. In the automatic control mode, in this case, the high beam is automatically switched over to the low beam on a curve more gentle than what has been initially set.

Further, if the high beam is switched over to the low beam with a weather data of a value smaller than the threshold weather value TW in the manual control mode, the learned threshold weather value TWa becomes Twa<TW. In the automatic control mode, in this case, the high beam is automatically switched over to the low beam under a condition where it is raining less than what has been initially set.

It should be noted that the present invention is not limited to the above embodiment only but can be modified in a variety of other ways without departing from the spirit and scope of the invention.

In the above embodiment, for example, the headlight 10 uses a lamp having a filament for low beam and a filament for high beam. Instead, the headlight 10 may use many LEDs (light-emitting diodes), and the turn-on pattern of the LEDs (number and positions that are turned on) may be varied to increase or decrease the amount of illumination toward a distance.

In the above embodiment, further, the turning condition of the vehicle is detected based on the steering angle signal output from the steering angle sensor 15. However, the turning condition of the vehicle may be detected based on the yawing angle data from a yawing angle sensor that detects the yawing angle. Further, the turning condition of the vehicle may be detected by detecting the fact that the vehicle is traveling on a curved section of a road based on the road data from the navigation device.

At S10 in the processing of FIG. 4 of the embodiment, if the detected value such as the vehicle speed is an abnormal value inhibited by the traffic rules, a message "Invalid" may be output, and the processing may be returned to S1 without executing the learning processing.

The present invention can be applied to a headlight control device for vehicles, which detects the traveling conditions of the vehicle and automatically switches the illumination state of the headlight.

What is claimed is:

1. A headlight control device for vehicles comprising:
   means for manually switching an illumination state of a headlight between a first illumination state and a second illumination state where the amount of illumination to a distance is larger than that in the first illumination state;
   means for detecting a traveling condition of the vehicle; and
   an electronic control unit including means for automatically switching the illumination state of the headlight and means for learning a threshold value; wherein
   the automatically switching means is configured to switch the illumination state of the headlight between the first illumination state and the second illumination state based on the threshold value depending upon the traveling condition detected by the detecting means;
   the learning means is configured to learn a new threshold value for determining switching between the first illumination state and the second illumination state based on the traveling condition detected by the detecting means when the illumination state of the headlight is manually switched by the manually switching means, and
   the automatically switching means is configured to determine the switching between the first illumination state and the second illumination state by using the new threshold value for determining the switching over learned by the learning means.

2. The headlight control device for vehicles according to claim 1, wherein the learning means learns the new threshold value for determining the switching during a predetermined learning condition.

3. The headlight control device for vehicles according to claim 2, wherein the learning condition includes a case where a value representing the traveling condition detected by the detecting means at the time of manual switching is a normal value.

4. The headlight control device for vehicles according to claim 2, further comprising:
   means for switching over an operation mode between an automatic control mode which enables the operation of the automatically switching means and a manual control mode which inhibits the operation of the automatically switching means,
   wherein the learning condition includes a case where the manual control mode is assumed.

5. The headlight control device for vehicles according to claim 1, wherein the learning means learns the new threshold value for determining the switching by moderating the value representing the traveling condition detected by the detecting means at the time of manual switching.

6. The headlight control device for vehicles according to claim 1, further comprising:
   means for adjusting the threshold value for determining the switching.

7. The headlight control device for vehicles according to claim 1, wherein the detecting means includes means for detecting front illumination, and the learning means learns a threshold illumination level as the new threshold value for determining the switching.

8. The headlight control device for vehicles according to claim 1, wherein the detecting means includes means for detecting a vehicle speed, and the learning means learns a threshold vehicle speed as the new threshold value for determining the switching.

9. The headlight control device for vehicles according to claim 1, wherein the detecting means includes means for detecting a turning condition, and the learning means learns a threshold value related to the turning condition as the new threshold value for determining the switching.

10. The headlight control device for vehicles according to claim 1, wherein the detecting means includes means for detecting a weather condition, and the learning means learns a threshold value related to the weather condition as the new threshold value for determining the switching.

11. A headlight control method for vehicles comprising:
    detecting a traveling condition of a vehicle;
    automatically switching an illumination state of a headlight between a first illumination state and a second illumination state depending upon a comparison of a detected traveling condition with a threshold value, the amount of illumination to a distance being larger in the second illumination state than that in the first illumination state; and learning a new threshold value for determining automatic switching between the first illumination state and the second illumination state based on the traveling condition detected when the illumination state of the headlight is manually switched over by a manual switch.

12. The headlight control method according to claim 11, wherein the learning step learns the new threshold value only in a predetermined learning condition in which the detected traveling condition at the time of manual switching over is not an abnormal value.

13. The headlight control method according to claim 11, wherein the learning step learns, as the new threshold value, at least one of a vehicle front illumination level, a vehicle speed, a vehicle turning condition, and a weather condition.

14. The headlight control method according to claim 11, further comprising:
 delaying the automatic switching over from the first illumination state to the second illumination state for a predetermined time after a determination of switching based on the comparison of the detected traveling condition.

15. A headlight control device for vehicles comprising:
means for manually switching an illumination state of a headlight between a first illumination state and a second illumination state where the amount of illumination to a distance is larger than that in the first illumination state;
means for detecting a traveling condition of the vehicle; and
an electronic control unit including means for automatically switching the illumination state of the headlight and means for changing a threshold value; wherein
the automatically switching means switches the illumination state of the headlight between the first illumination state and the second illumination state based upon the threshold value and depending upon the traveling condition detected by the detecting means;
the changing means changes the threshold value for determining switching between the first illumination state and the second illumination state based on the traveling condition detected by the detecting means when the illumination state of the headlight is manually switched by the manually switching means, and
the automatically switching means determines the switching between the first illumination state and the second illumination state by using the changed threshold value for determining the switching changed by the changing means.

* * * * *